United States Patent [19]
Abromavage

[11] Patent Number: 4,838,605
[45] Date of Patent: Jun. 13, 1989

[54] TRUCK BODY DECK MOUNT
[75] Inventor: John C. Abromavage, Tempe, Ariz.
[73] Assignee: U-Haul International, Phoenix, Ariz.
[21] Appl. No.: 180,191
[22] Filed: Apr. 11, 1988
[51] Int. Cl.[4] .............................................. B62D 33/02
[52] U.S. Cl. ................................... 296/182; 296/204; 52/483; 105/422
[58] Field of Search ............... 296/182, 183, 181, 204; 52/483; 105/422

[56] References Cited
U.S. PATENT DOCUMENTS

| | | | |
|---|---|---|---|
| 2,100,323 | 11/1937 | Fitch | 296/183 |
| 2,735,517 | 2/1956 | Peterson | 296/204 |
| 3,692,349 | 9/1972 | Ehrlich | 296/181 |
| 3,856,344 | 12/1974 | Loeher | 296/204 |
| 4,564,233 | 1/1986 | Booher | 296/182 |

FOREIGN PATENT DOCUMENTS
65623 12/1982 European Pat. Off. ............ 296/182

Primary Examiner—Robert R. Song
Attorney, Agent, or Firm—Cahill, Sutton & Thomas

[57] ABSTRACT

A truck body deck formed of transverse slats is attached to the truck chassis by longitudinal angle members which are connected to both the slats and the longitudinal frame members of the chassis. Each angle member has its upright portion secured to the outer face of its respective frame member and its horizontal portion extending outwardly away from its frame member. Mechanical fasteners pass through the transverse slats into the horizontal portions of the angle members to affix the slats on the angle members.

2 Claims, 1 Drawing Sheet

TRUCK BODY DECK MOUNT

TECHNICAL FIELD

This invention is concerned with mounting a truck body deck on the chassis of a motor vehicle.

BACKGROUND ART

For many years it has been the practice to construct truck bodies as structural units substantially independent of the chassis of the motor vehicle. In other words, the body has been designed as a self-supporting structure which was intended to be lifted on to the chassis and tied or bolted down on the chassis at only wisely spaced intervals.

This construction approach most often dictated that the deck, or floor pad, of the truck body be constructed with a reinforcing substructure of transverse and longitudinal crossbeams to give the truck body sufficient strength and rigidity. U.S. Pat. No. 2,100,323, granted Nov. 30, 1937 to B. F. Fitch for "AUTOMOTIVE TRUCK BODY" discloses a truck body utilizing this construction technique. The presence of such deck substructures has resulted in the deck being positioned a significant distance above the vehicle chassis and, hence, a substantial distance above the road surface.

Except for very large trucks and semi-tractor trailers intended to be loaded from elevated loading docks, the farther the truck body deck is above the road surface the more effort must be exerted to load the truck. This is a very practical consideration in rental truck fleets, for example, where it is expected the truck will more often then not be loaded by inexperienced personnel using an inclined ramp. The goods are usually carried, one at a time, from the road surface up the ramp and into the truck. If the truck body deck is even a few inches higher than it actually need be, undesirable loading effort must be expended.

There has been another undesirable aspect of body deck mounting in the prior art growing out of irregularities in the mounting surface of the truck chassis, i.e. the upper surface of the longitudinal frame members of the chassis. Such irregularities are caused in some instances merely by the presence of rivet heads or other fastener elements on the upper surface of the frame members. These protuberances and other irregularities have led to the practice of providing deformable spacers, such as wood strips, between the chassis frame members and the body deck structure. This, of course, further increased the elevation of the deck above the road surface. A representative structure of this type is described hereinafter in the Best Mode section of this specification to contrast that structure with the present invention.

DISCLOSURE OF THE INVENTION

This invention envisions that the truck body deck be constructed of transverse slats which, when affixed to the truck chassis in the manner hereinafter specified, have sufficient strength and rigidity to constitute the entire bottom of the truck body with no further understructure reinforcement. These transverse slats are secured to the truck chassis by a very simple arrangement involving longitudinal angle members which are connected to both the slats and the longitudinal frame members of the chassis. Normally, the truck chassis has two longitudinal frame members. For such a chassis there is provided a longitudinal angle member for each frame member and the angle member has its upright portion secured to the outer face of its respective frame member. A horizontal portion of each angle member extends outwardly away from its frame member and mechanical fasteners pass through the transverse slates into the horizontal portions of the angle members to affix the slats on the angle members. The horizontal portion of each longitudinal angle member may be elevated with respect to the upper regions of the frame members only sufficiently to enable the transverse deck slats to clear any protuberances or other irregularities in and on the upper surfaces of the frame members. The result is a strong, rigid, cooperative structure in which the truck body deck is disposed at an absolute minimum elevation above the truck chassis.

BEST MODE FOR CARRYING OUT THE INVENTION

Figure 1:
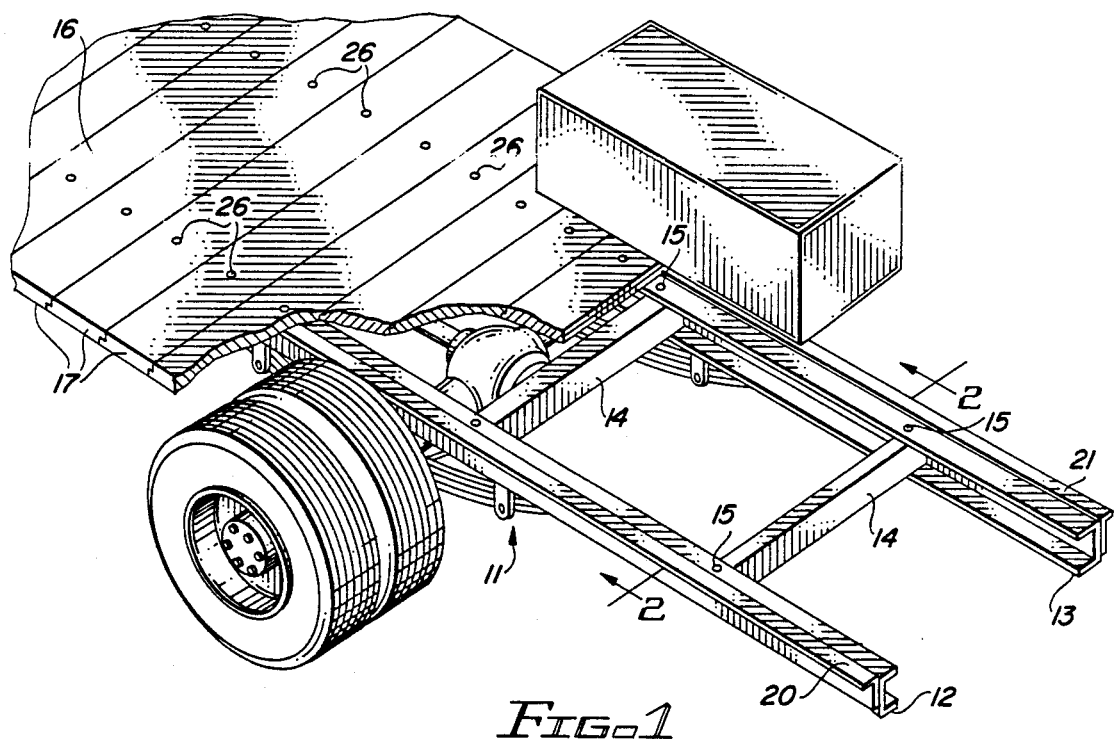
FIG. 1 is a fragmentary perspective view illustrating a truck body deck mounted on a motor vehicle chassis in accordance with this invention.

The truck chassis illustrated in FIG. 1 is identified generally by reference numeral 11 and includes a pair of longitudinal frame members 12 and 13 and a plurality of transverse frame members 14. As is typical of truck chassis the longitudinal frame members 12 and 13 have C-shaped cross-sections and are positioned over the vehicle suspension in substantially horizontal and parallel positions with their open sides facing each other. The transverse frame members 14 are secured to the longitudinal frame members 12 and 13 by suitable means, such as rivets 15.

Mounted on the chassis 11 is a truck body deck, or floor, 16 made up of a series of transverse slats 17. When secured to the chassis 11 in the manner hereinafter described, the transverse slats 17 form the entire bottom wall of the truck body without further reinforcing structure. Indeed, the deck 16 made of slats 17 can be utilized to support the remainder of the truck body with the walls of the body (not shown) affixed to the ends of the slats 17.

Figure 3:
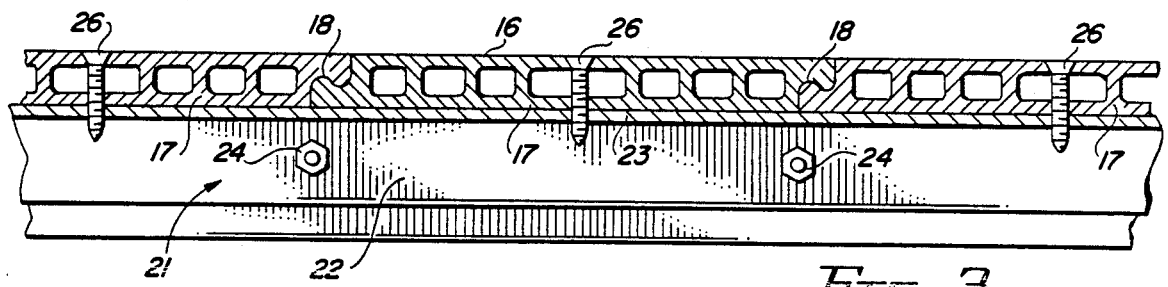
FIG. 3 is an enlarged and fragmentary vertical sectional view taken generally as indicated by line 3—3 in FIG. 2.

Deck slats 17 are preferably formed of extruded, lightweight metal, such as aluminum, to possess a hollow, ribbed interior (see FIG. 3). This slat structure affords considerable strength and stiffness for the deck 16 with a minimum of weight. The edges of the slats 17 are also preferably shaped to provide interlocking rabbet joints 18 between adjoining slats. The rabbet joints 18 are effective to strengthen the deck 16 and further to prevent air and water from entering the truck body through the deck. Other types of joints can be employed for connecting the slats 17.

The means for connecting slats 17 of deck 16 to longitudinal frame members 12 and 13 includes a pair of longitudinal angle members 20 and 21. The angle members are formed metal, preferably steel, and possess upright portions 22 and horizontal portions 23. Each of the angle members 20 and 21 is secured to the outboard, closed face of its respective frame member, 12 or 13, by suitable means such as a series of bolts 24.

Figure 2:
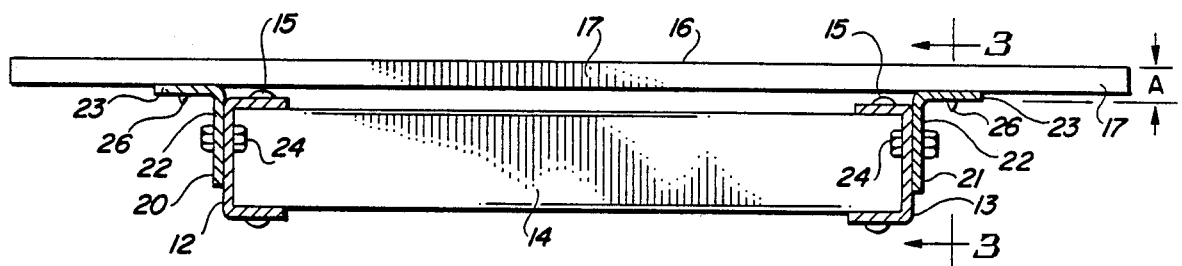
FIG. 2 is a vertical sectional view taken generally as indicated by line 2—2 in FIG. 1.

The angle members 21 and 22 are positioned on their respective frame members 12 and 13 in such a manner that the upper surfaces of their outwardly extending horizontal portions 23 are elevated slightly above the protuberances or any irregularities on the upper surfaces of the frame members such as might be caused, for example, by the rivets 15. By this arrangement the deck slats 17, which rest directly on the horizontal portions 23 of angle members 20 and 21, clear these protuberances or irregularities. The amount of elevation of horizontal portions 23 of angle members 20 and 21 above frame members 12 and 13 is desirably held to the absolute minimum as it is the objective of the mounting arrangement to minimize the elevation of the deck 16 above the frame members 12 and 13. The elevation to be minimized is indicated by dimension A in FIG. 2. If there are no protuberances or irregularities on the upper surfaces of frame members 12 and 13, the upper surfaces of angle members 20 and 21 can be flush with frame members 12 and 13.

The mounting of deck 16 is completed by securing each of the slats 17 to each of the angle members 20 and 21. Selftapping screws 26 passing through predrilled holes in the slats 17 and the horizontal portions 23 of angle members 20 and 21 are particularly effective for this purpose.

Figure 4:
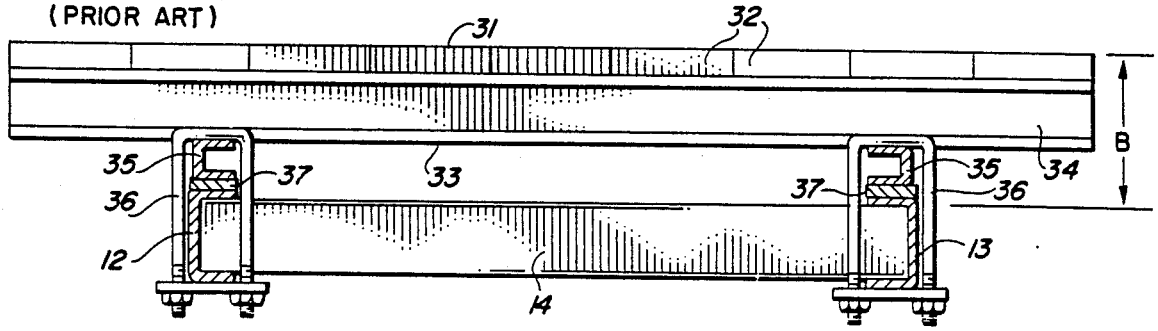
FIG. 4 is a vertical sectional view through a truck deck mount of the prior art.

The advantages of the invention described in detail above can best be appreciated by comparing that structure with another truck body mounting arrangement which is in common use today. That arrangement is illustrated in FIG. 4 of the drawings. The chassis frame members 12, 13 and 14 are identical to the members similarly identified above.

In the prior art structure of FIG. 4, however, the deck 31 is comprised of longitudinal slats 32 which require a substructure 33 consisting of transverse support beams 34 resting atop a pair of longitudinal support beams 35. The deck substructure 33 is connected to frame members 12 and 13 by several U-bolts 36 which clamp the longitudinal support beams 35 onto the frame members 12 and 13. Compressible wood strips 37 are positioned between the support beams 35 and frame members 12 and 13 to compensate for the irregularities in or protuberances on the upper surfaces of frame members 12 and 13.

It can be appreciated that the elevation of prior art deck 31 above chassis frame members 12 and 13 (dimension B in FIG. 4) is considerably greater than the elevation (dimension A in FIG. 2) of the deck 16 mounted in accordance with this invention.

One further advantage can be noted for the mounting arrangement of this invention. With the angle members 20 and 21 mounted on the outboard faces of frame members 12 and 13 and having their horizontal portions 23 projecting outwardly from the center line of the vehicle these horizontal portions 23 extend the support for the deck 16 closer to the ends of the slats 17 to strengthen that portion of the deck 16 which supports the remainder of the truck body.

What is claimed is:

1. In an arrangement for mounting a truck body deck on the chassis of the truck wherein the chassis includes a pair of longitudinal frame members, said frame members being characterized by having C-shaped cross-sections disposed with the open regions facing each other and having protuberances on their upper surfaces, the combination with the chassis of an elongated angle member mounted on the outer face of each of said frame members, each angle member being substantially coextensive with that portion of its frame member which is disposed beneath the deck, each angle member having a vertical portion fastened to its respective frame member and a horizontal portion extending outwardly from its respective frame member, the horizontal portion of each angle member having its upper surface disposed at an elevation greater than the protuberances on said frame members, and transverse deck members overlying and secured directly to said angle members.

2. In an arrangement for mounting a truck body deck on the chassis of the truck wherein the chassis includes a pair of longitudinal frame members, the combination with the chassis of an elongated angle member mounted on the outer face of each of said frame members, each angle member being substantially coextensive with that portion of its frame member which is disposed beneath the deck, each angle member having a vertical portion fastened to its respective frame member and a horizontal portion extending outwardly from its respective frame member, the horizontal portion of each angle member having its upper surface disposed at an elevation at least as high as the elevation of at least a portion of the upper surface of said frame members, and transverse deck members overlying and secured directly to said angle members.

* * * * *